April 3, 1945.  W. WILSON  2,372,921
CABLE LAYER
Filed July 12, 1943  3 Sheets-Sheet 1
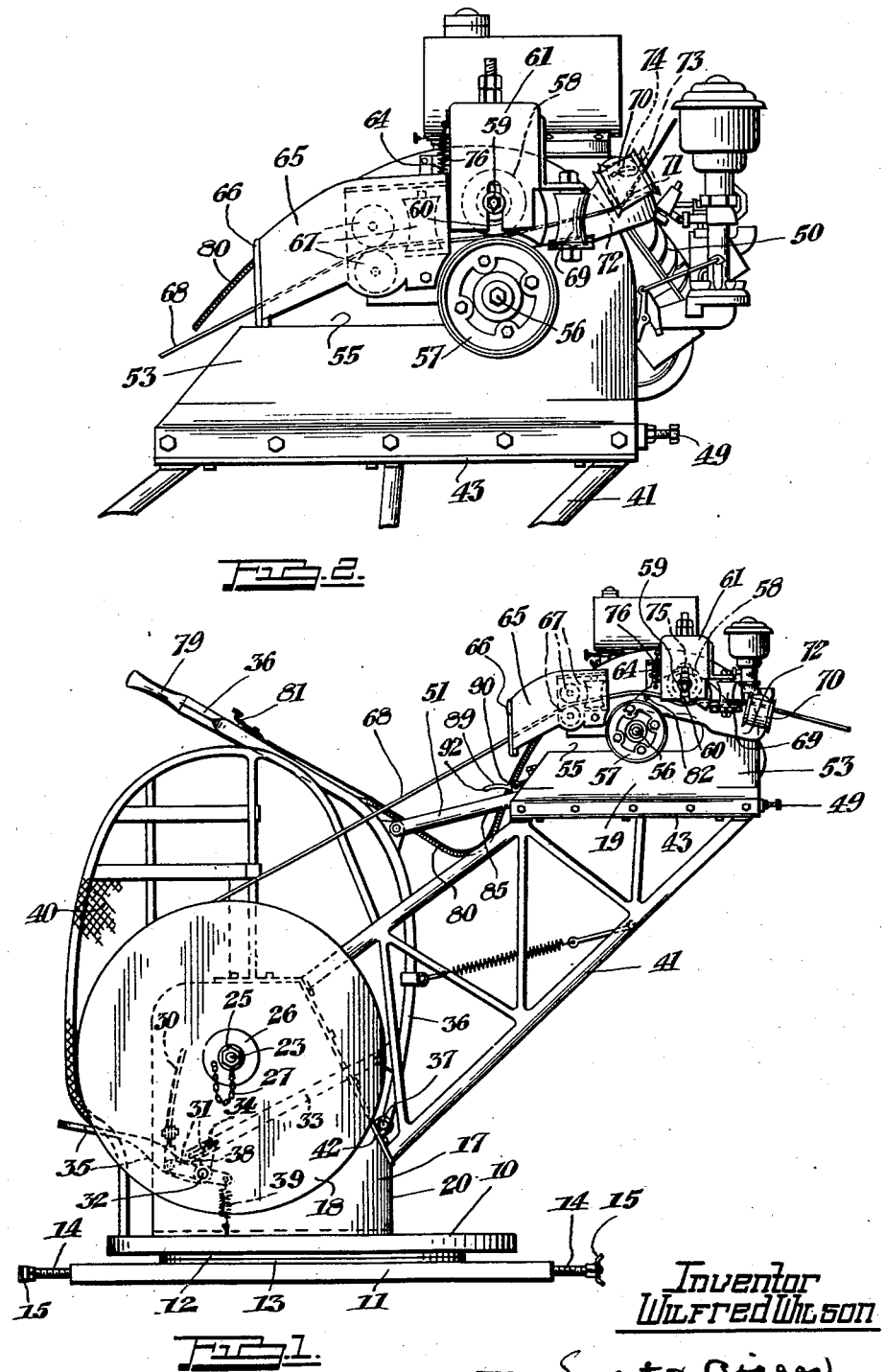

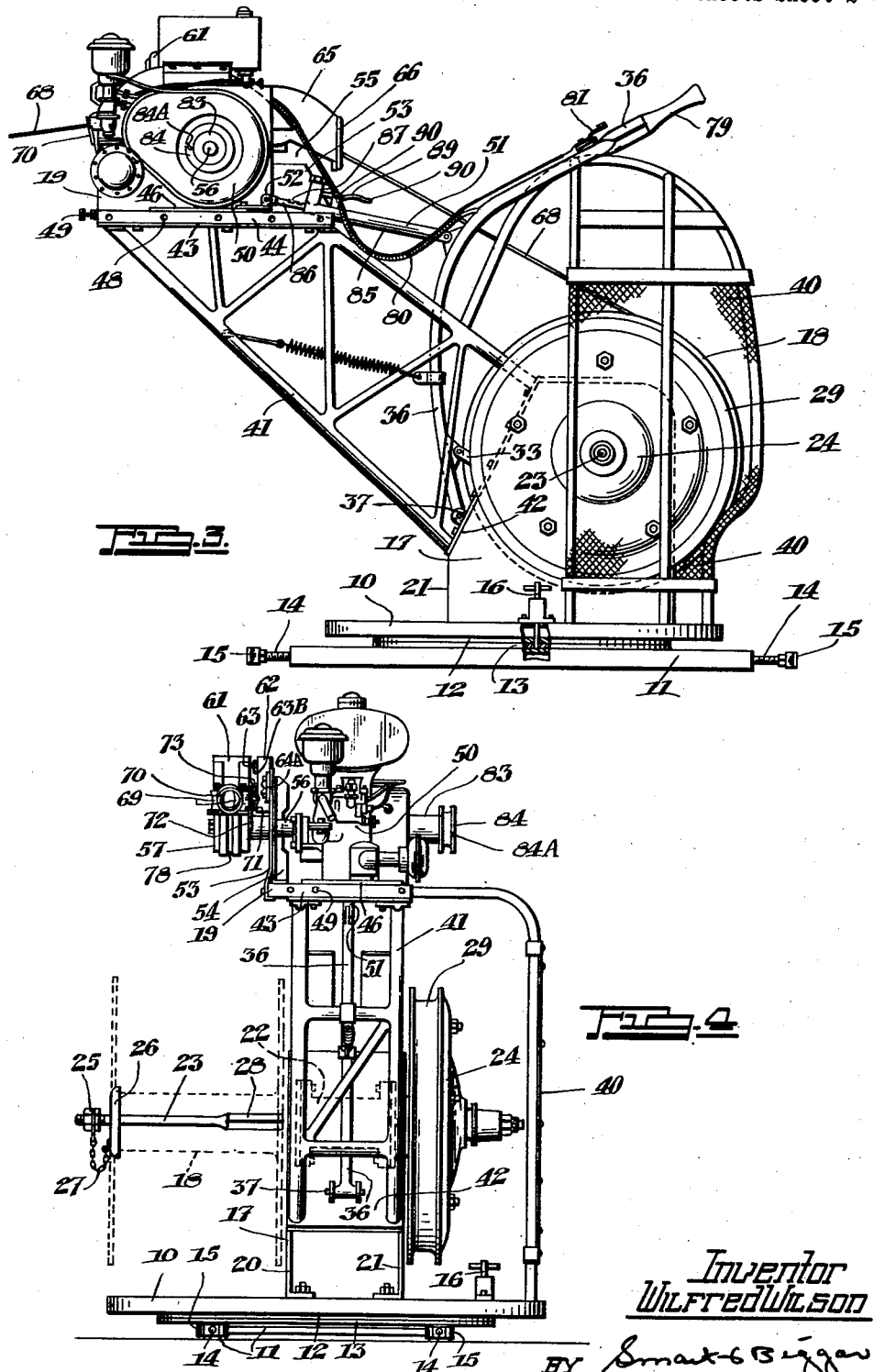

April 3, 1945.　　　　W. WILSON　　　　2,372,921
CABLE LAYER
Filed July 12, 1943　　　3 Sheets-Sheet 3
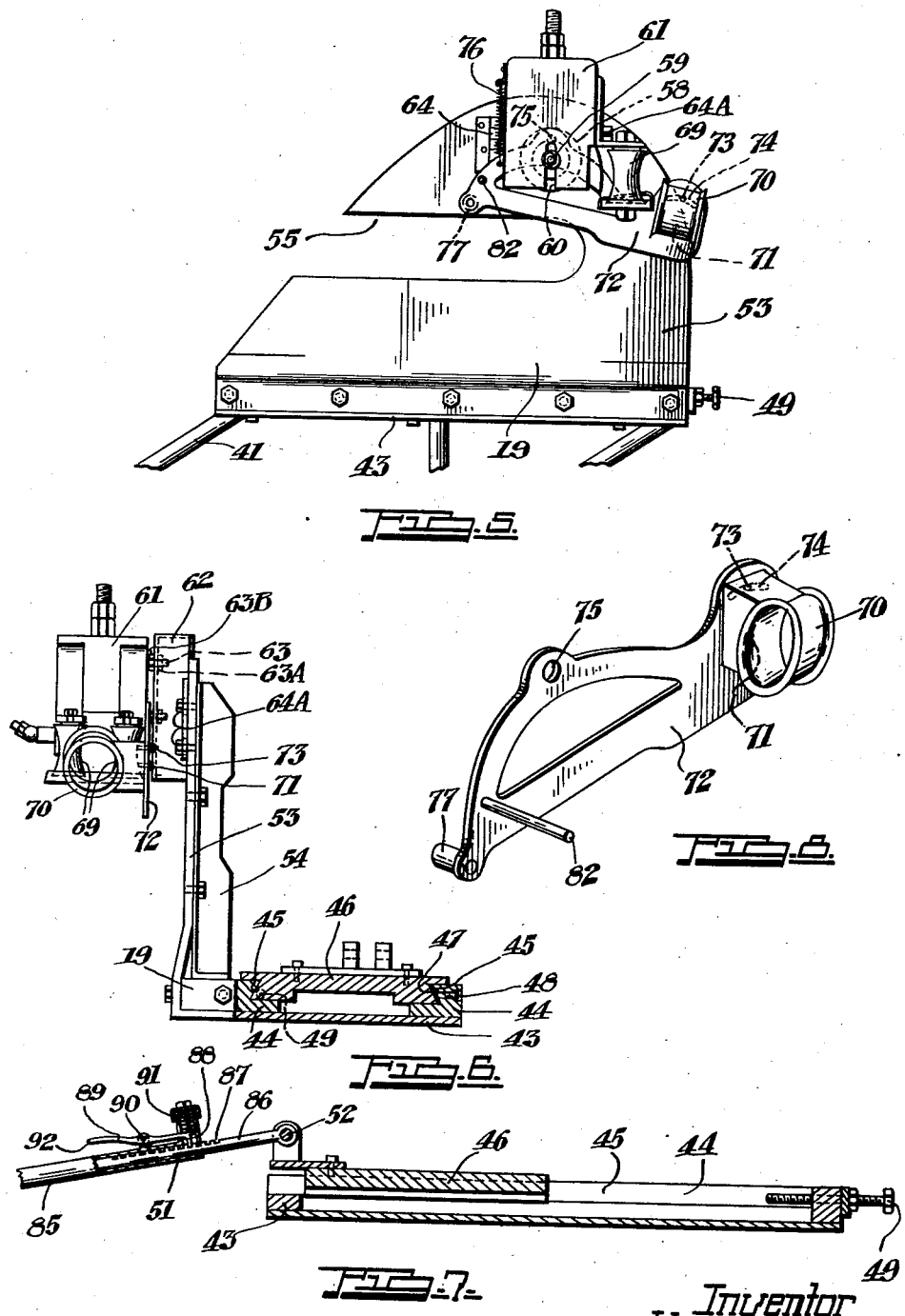
Inventor
WILFRED WILSON
BY Smart & Biggar
Attys.

Patented Apr. 3, 1945

2,372,921

UNITED STATES PATENT OFFICE 2,372,921

CABLE LAYER

Wilfred Wilson, Val Tetreau, Quebec, Canada

Application July 12, 1943, Serial No. 494,297
In Canada June 28, 1943

20 Claims. (Cl. 242—54)

This invention relates to apparatus for laying and recovering cable, wire and the like and is particularly concerned with the laying of field telephone cable for military purposes by means of a cable layer of the type in which cable is drawn from a drum and is ejected from two rollers or wheels, one of which is power driven, the cable layer being mounted on a vehicle which advances as cable is laid.

It is possible to lay cable by mounting a drum on a shaft at the rear of a vehicle, fixing the loose end of cable and advancing the vehicle. Because the speed at which the drum turns depends on the pull exerted on the cable and the drum has a tendency to turn too fast when a sudden pull is exerted, backlash is developed in the cable which causes it to loosen on the drum and to slip over the shoulders of the drum and become twisted and kinked. An early development in the art was therefore designed to overcome this difficulty, and consisted of providing a brake on the drum. However, this alone did not solve the problem because the force pulling the cable from the drum remained subject to great fluctuations, with the result that, if the brake was not applied with the greatest care, slack was taken up too suddenly and the cable was snapped.

The next development in the art was to provide mechanical means for rotating the drum independently of movement of the vehicle and in some cases it was proposed to pass the cable between two idling rollers. A later development was to provide drive means for at least one of the rollers through which the cable is passed whereby the cable may be actually drawn from the drum and ejected at a uniform speed which prevents any sudden pulls on the cable with resulting backlash and snapping of cable. The known machines embodying this feature have the advantage of being able to throw the cable to either side of the carrying vehicle, but they have only been able to operate at moderate speeds and cannot throw cable far enough to meet modern requirements.

The development embodying power-driven rollers is shown in its simplest form in U. S. Patent 2,245,788, June 17, 1941, according to which the cable drum is driven by a hand crank, one of the rollers is driven by a belt from the cable drum, and a spring device is provided for tensioning the belt. According to U. S. Patents 2,203,435, June 4, 1940, and 2,223,110, November 26, 1940, a motor is added which is connected by means of pulley-wheels to a countershaft provided with a plurality of pulley-wheels adapted to co-operate either with a pulley connected to the feed rollers for paying out cable or with a pulley connected to the cable drum for reeling in cable. The countershaft is mounted on a beam adapted to be rocked to tension the appropriate belt, by means of a traveller forming a nut which is engaged by a screw-threaded spindle fitted with a hand wheel. What is called the first motion driving belt, that is the belt which drives the countershaft pulley from the motor, is tensioned by a spring-pulled jockey pulley mounted on a pivoted link. This jockey pulley is moved against its springs out of its tensioning position by means of a lever which at the same time applies a brake device to the cable drum. A second lever is provided for separating the feed rollers and in the earlier Patent No. 2,203,435 this is operated by a foot pedal, as is the brake lever.

It will be seen that when cable is being laid by a machine according to these prior proposals the operator has three things to attend to (a) the tensioning of the belt which drives the feed roller, this tensioning being effected by the turning of the hand wheel, (b) the release of the feed rollers by separating them with the lever provided, and (c) application of the brake and disengagement of the jockey pulley which keeps in tension the belt connecting the countershaft and the drive motor. In practice it has been found that it is an instinctive reaction of an inexperienced operator to turn the hand wheel when any difficulty arises. If he turns it in the direction to release the tension on the belt driving the feed roller, the ejecting action of the rollers is at once stopped and, if cable is being laid at the normal speed, the cable is broken. Another reaction is to press down on the brake pedal. The result of this, of course, is that the drum is prevented from turning and tension is taken off the main pulley belt, so that the feed rollers cease their ejecting action and again the cable is snapped.

An object of the present invention is, therefore, to provide a mechanical cable layer which avoids these disadvantages and entirely dispenses with the system of belts and pulleys of the prior proposals in laying cable and uses only one belt in reeling it in.

A further object of the invention is to provide a mechanical cable layer which is capable of throwing cable at such speed and with such accuracy that the speed of laying is more than doubled, and the actual length of cable used per mile of communication is greatly decreased.

A still further object is to provide cable elevating arrangements such that cable may be thrown up and over unusually high obstacles such as hedges.

Another object of the invention is to provide an arrangement in which a single master control lever controls the braking of the drum, the ejecting of cable and the elevation and depression of the ejected cable.

These, and other objects of the invention which will appear from the following description and claims, are achieved by a mechanical cable layer according to the invention which in general terms comprises means for supporting a drum of cable rotation, brake means for controlling the rotation of the drum, and cable ejecting apparatus comprising a support, an idler wheel, a power wheel, drive means for rotating the power wheel and means for moving the drive means and power wheel as a unit on said support to bring the peripheral surfaces of the two wheels into cooperating relationship to engage cable frictionally therebetween, whereby cable is drawn from the drum and is ejected from the apparatus. According to the preferred modification the means coupled to drive the power wheel consists of a motor which is movable longitudinally of its support, the longitudinal axis of the support being substantially at right angles to the axis of rotation of the cable drum. The motor is moved by a master control lever provided with a twist grip type of control for adjusting the speed of the motor, and connected to the brake means so that the single lever controls the speed of laying, the operation of the ejecting wheel and the actuation of the brakes. According to the preferred modification this lever also controls the elevating guide which is adapted to be elevated and depressed on movement of the motor by the lever a distance sufficient to elevate the guide but insufficient to break the connection between the ejecting wheels, i. e., movement of the motor within the range of co-operating contact of the ejecting wheels. By "co-operating contact" is meant a physical relationship effective to eject cable, which includes contact through the cable sufficient to eject cable, as well as direct contact.

In the drawings—

Figure 1 is a view of what, for convenience, will be called the right side of the machine, the motor and power wheel or roller being shown in the retracted position and the brake linkage being shown in dotted lines, Figure 2 is an enlarged view of the right side of the ejecting apparatus showing the motor and the power wheel in the advanced position and the elevating guide in the elevated position, Figure 3 is a view of the left side of the cable layer showing the platform and frame cut away sufficiently to show the locking means therefor in section, Figure 4 is a front view, Figures 5 and 6 are details of the fixed components of the ejecting apparatus, Figure 6 being taken from the front and Figure 5 from the right side, part of the motor support and sliding motor bed block being shown in section in Figure 6, Figure 7 is a longitudinal section through the motor support and sliding block showing the connection of the control lever to the block and also showing the locking means for the telescopic connecting rod, and Figure 8 is a perspective view of the elevating guide.

As will be seen from Figures 1 and 3, the cable layer is mounted on a turntable consisting of a platform 10 and a base frame 11. On its lower face the platform 10 is provided with a slipper ring 12 and on its upper face the frame 11 is provided with a cooperating slipper ring 13, the platform 10 and frame 11 being connected together at the centre of the slipper rings by the usual pivot pin (not shown). Extensible shafts 14, one of which is provided on each corner of the frame, are provided with gripping members 15 and are adapted, when extended to grip the sides of a vehicle platform, to anchor the machine. At 16 (Figure 3) is shown a downwardly spring-pressed pin mounted on the platform 10 adapted to extend through aligned holes of a plurality formed in each of the slipper rings to lock the platform and the frame against relative rotation. When pin 16 is lifted upwardly against its spring it is withdrawn from the holes and the platform may be rotated through 360°.

The main supporting frame 17 for the cable drum 18 and the ejecting apparatus indicated generally by the reference numeral 19 consists essentially of side plates 20 and 21 in which is mounted journal-bearings 22 shown in dotted lines in Figure 4. Shaft 23 rotates in this bearing 22 and carries at the left side of the machine (the right side of the sheet in Figure 4) a brake drum 24, and at the right side of the machine a cable drum 18 readily removable by unscrewing nut 25 and removing adapter washer 26 secured to nut 25 by a short chain 27 to prevent loss. As shown in Figure 4 at 28, the shaft 23 adjacent to its supporting frame 17 is squared to engage the bore of the drum hub of the same shape, and the brake drum 24 is keyed to shaft 23 so that rotation of the drum causes the shaft and the brake drum to rotate, and rotation of the drum by means of a belt connected to pulley wheel 29 (as hereinafter described) causes the drum 18 to rotate. Within brake drum 24 and mounted on frame 17 is an internally expanding cable-controlled brake, the details of which are not shown. As shown in dotted lines in Figure 1, the brake is actuated by the usual Bowden cable 30 and the internal operating wire of the cable is connected to one arm of a bell-crank lever 31 mounted to be rotated by shaft 32. Rod 33 is connected through pin 34 to the other arm of lever 31 and brake pedal 35 is then connected to rotate shaft 32 so that the brake may be actuated either by depressing brake pedal 35 or by moving rod 33 to the left by means of master control lever 36 which is pivoted at 37. Slot 38 is provided in rod 33 to prevent actuation of the brake by means of pedal 35 interfering with the other functions of the control lever 36 which are described later. Spring 39 is connected to an extension of pedal 35 and maintains the pedal out of operative position and the brakes disengaged. A guard 40 is provided around the brake drum 24 and pulley wheel 29, as shown in Figures 1, 3 and 4.

As shown in Figures 1 and 3, the ejecting apparatus 19 is supported above and in front of (meaning thereby to one side of and in line with) the cable drum 18 by means of scaffolding 41 of seamless steel tubing welded to plate 42 which in turn is bolted to frame 17. The ejecting apparatus comprises a motor supporting platform 43 which is rectangular with its longitudinal axis running substantially parallel to that of the turntable platform 10 and substantially at right angles to the axis of the cable drum. As appears from Figures 6 and 7, the motor support platform 43 is in the form of a frame, the longitudinal side members of which numbered 44 are provided with grooves 45 forming a dove-tailed channel or slideway adapted to receive a motor bed block 46 of corresponding configuration, the bed block 46 sliding longitudinally of said motor support platform in said grooves 45. At 47 is shown a gib key with its co-operating set screw 48. Adjustable stop pin 49, which is most clearly seen in Figure 7, determines the limit of forward movement of the bed block 46. A motor indicated generally by the reference numeral 50 is secured to the bed block 46 and is movable longitudinally of motor support platform 43 with bed block 46, movement being effected by control lever 36 through telescopic connecting rod 51 hingedly connected at 52 to bed block 46.

At the right side of the motor support platform 43 is secured an upright idler supporting plate or bracket 53 with a strengthening flange 54 (Figure 6). This plate 53, as is most clearly seen in Figure 5, is provided with an open-ended slot 55 through which extends and in which travels a motor shaft 56 as the motor is moved black and forth. A rubber tired power wheel 57 is mounted on motor shaft 56 at the right side of the motor and the right side of supporting plate 53, and is connected to be driven by it. When the motor 50 is in the position shown in Figure 2, the wheel 57 presses upwardly against an idler wheel 58 which rotates on shaft 59 and is movable vertically in housing 61 against the action of springs (not shown). The right hand end of shaft 59 travels in vertical slot 60 formed in the right side of housing 61. This housing is bolted to adapter 62 by means of bolts 63 and nuts 63A (see Figure 6), the bolts 63 passing through two vertical slots in the wall of the adapter which is separated from the housing by spacers 63B. Adapter 62 is secured to supporting plate 53 at the rear by means of a hinge 64 which is shown in Figures 1 and 5, and at the front by bolts 64A. By removing bolts 64A and swinging the adapter 62 and housing 61 to the rear on hinge 64, the nuts 63A are made accessible, and by adjusting the bolts 63, the housing 61 and, therefore, the idler wheel 58 may be raised or lowered.

Indirectly connected to the motor to move therewith in relation to the vertical support 53 is a rear guide housing 65 having at its rear end a guide ring 66 and having mounted within its forward portion four guide rollers 67 between which a length of cable is threaded after it has passed through the guide ring 66. These rollers and the guide ring 66 are so arranged as to guide cable from the drum 18 to be frictionally engaged between the peripheral surfaces of power wheel 57 and idler wheel 58. After leaving these wheels cable 68 passes between forward guide rollers 69 and through guide member 70 which is shown in the form of a ring. As appears from Figure 8, this ring is pivotally mounted at 71 on arm 72 and may be locked in a desired position by means of bolt and thumb nuts 73 adapted to slide in arcuate slot 74. The arm 72 is mounted at 75 at the left hand side of the idler housing 61 on the lower of the two bolts 63 and is rocked about this bolt. Normally it is held in the depressed position, that is with the rear end raised, by means of spring 76 and this rear end is depressed so as to elevate the guide member 70 by pressure exerted downwardly on roller 77.

Pressure is so exerted by the forward end of rear guide housing 65 as the motor is moved forward on its support 43, and the position of the forward end of the housing is so calculated in relation to the power wheel 57, and the position of roller 77 is so calculated in relation to the point of contact between the two ejecting wheels that roller 77 is not contacted and therefore the elevating guide is not elevated until the motor has moved forward sufficiently to bring the power wheel 57 into reciprocating contact with idler wheel 58 thereby frictionally engaging the cable therebetween and ejecting it on operation of the motor 50. Elevation of the guide is then completed before the motor can be moved far enough to separate the two wheels again, and the extent of this forward movement is controlled by stop pin 49 mentioned above. Complete elevation and depression of the elevating guide is thus effected by a relatively small movement of the motor all within the range of co-operating contact of the power wheel 57 and the idler wheel 58.

Considering Figure 2 it will be seen that when the elevating guide is at maximum elevation a line running through the axes of the power wheel and the idler wheel runs substantially straight up and down. When the guide member 70 is in the position shown in full lines in Figure 2, the cable then strikes the inside surface of the guide member at the bottom and is deflected sharply upwards at an angle of approximately 58 degrees. A relatively slight retraction of the motor lowers the elevating guide very slightly but effects a relatively large drop in the angle at which the cable leaves the guide member. When it is desired to deflect cable sharply downward the thumb nut 73 is loosened, the guide member 70 is pivoted forward and the thumb nut 73 is again tightened so that when the motor is retracted sufficiently to bring the arm 72 to the position of maximum depression, cable will be deflected sharply downward from the inside surface of the top of the guide member 70. When only a moderate range in elevation is desired the guide member 70 will be fixed at an intermediate point in the slot 74, such for example as shown in dotted lines in Figure 2. Because movement of the motor on its bed tilts forward and back the above mentioned line running through the axes of the two wheels, so that the line of contact of the wheels is depressed and elevated, movement of the power wheel away from the cable drum gives an elevation to the ejected cable which co-operates with the elevating guide. (By "the line of contact" is meant a line running through the point of contact and at right angles to the line joining the axes of the two wheels.)

Referring to Figure 4, the idler wheel 58 and the rubber tire of the power wheel 57 are of substantially the same width as the guide member 70. This rubber tire is preferably of tough synthetic rubber and is provided with one or more centrally positioned shallow peripheral grooves 78. The idler wheel may be made of steel but it has been found that the life of insulated cable is appreciably lengthened by using for this wheel instead of steel a tough pressed paper based fibrous material known as Micarta.

As shown in Figures 1 and 3, the control lever 36 is provided with a twist grip handle 79 of known type embodying a Bowden wire 80 connected to the throttle of the motor which, as shown, is an air-cooled magneto-ignition engine. At 81 is shown the usual spring contact device for short-circuiting the magneto and thereby shutting off the motor.

Shown at 82 in Figures 1 and 8 is a pin projecting from the arm 72, the purpose of which is to hold the cable 68 out of engagement with the power wheel when the wheel is retracted from contact with the idler wheel.

For recovery and rewinding of cable a pulley wheel 83 (Figure 4) is mounted on the motor shaft at the left side of the machine and this pulley rotated by the motor is used to drive the pulley wheel 29 through a suitable endless belt, thus rotating the drum 24 in a direction to rewind cable onto drum 18. The motor is started by the usual pull rope wound in starting flanged pulley 84, a knot at the end of the rope being hooked into slot 84A (Figure 3). The belt coupling the pulleys 29 and 83 is tensioned by sliding the motor back and forth on its support just as in ejecting cable but in this case the power wheel 57 must not be in contact with the idler wheel 58 or the cable 68. Retraction of the motor to this extent, however, would normally operate the brake through rod 33 and prevent rotation of the cable drum. The connecting rod 51 is therefore telescopic so that the range of movement necessary for tensioning the belt may coincide with the range of movement of the lever 36 necessary to apply and disengage the brake, while at the same time maintaining the power wheel 57 out of contact with the idler wheel 58 and the cable 68.

As shown in Figure 7 the telescopic rod 51 comprises sleeve 85 and rod 86 adapted to slide therein. A plurality of notches 87 are formed in the rod 86 and a leg 88 of the lever 89 pivoted at 90 on the sleeve 85 is downwardly pressed by spring 91 so that it slips into one of the notches 87 and prevents the rod 86 from sliding in sleeve 85. The leg 88 of lever 89 is removed from notch 87 by pressing down the handle portion 92 of lever 89 against the action of spring 91.

As indicated above the cable layer according to the invention is intended particularly and has been developed for the laying and recovery of telephone cable and in particular that used for military field communications. In field tests such cable has been laid at speeds ranging from 4 to 45 miles per hour and in excess of 100 feet to either side of the advancing carrying vehicle. While the cable layer gives the best results with this type of cable, it can be used with almost equal satisfaction on other types of cable or wire and can, in fact, be readily applied to any type of cable or wire or rope which is sufficiently flexible to pass through the machine.

It will be understood that the motor may be of any suitable type and that the relative positioning of the motor and cable drum is a matter of choice within relatively wide limits. The particular advantage of the position of the motor as shown in the preferred modification is that the motor is readily cooled by air as the vehicle on which the cable layer is mounted travels. A further advantage is that the motor is in a position where it is out of the way and is safe from damage from the boots of personnel, tools and other equipment.

What I claim as my invention is:

1. A mechanical cable layer comprising means for supporting a drum or cable for rotation, brake means for controlling the rotation of the drum, and cable ejecting apparatus comprising a support, an idler wheel mounted thereon for rotation, power wheel drive means mounted on said support to be reciprocated thereon in a direction substantially at right angles to the axis of rotation of the cable drum, said drive means including a driven shaft, a power wheel connected to said shaft to be driven with it and to move with said drive means in relation to said support and means for moving said drive means and power wheel as a unit on said support to bring the peripheral surfaces of said wheels into cooperating relationship to engage cable frictionally therebetween and, on rotation of the power wheel, to draw cable from the drum and eject it from said apparatus.

2. A mechanical cable layer comprising means for supporting a drum of cable for rotation, brake means for controlling the rotation of the drum, and cable ejecting apparatus comprising a supporting structure, an idler wheel mounted thereon for rotation on an axis substantially parallel to that of the cable drum, a motor mounted on said supporting structure to be reciprocated thereon in a direction substantially at right angles to the axis of rotation of the cable drum, a shaft driven by said motor and arranged substantially parallel to the axis of said idler wheel, a power wheel connected to said shaft to be driven with it and to move with said motor and driven shaft in relation to said supporting structure and means for moving said motor on said supporting structure to bring the peripheral surface of the power wheel into cooperating relationship with the corresponding surface of the idler wheel to press cable from the drum against the idler wheel and, an operation of the motor, to draw cable from the drum and eject it from said apparatus.

3. A mechanical cable layer comprising means for supporting a drum of cable for rotation, brake means for controlling the rotation of the drum, and cable ejecting apparatus comprising a motor support platform rigidly connected to a supporting structure, the longitudinal axis of the platform being substantially at right angles to the axis of the cable drum, a motor connected to and slidable longitudinally of said platform, an idler wheel mounted in connection with said supporting structure to rotate on an axis substantially at right angles to the longitudinal axis of said platform, a shaft driven by said motor and arranged substantially parallel to the axis of said idler wheel, a power wheel connected to said shaft to be driven with it and to move in relation to said platform with said motor and driven shaft, and means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus.

4. A mechanical cable layer comprising means for supporting a drum of cable for rotation, brake means for controlling the rotation of the drum, and cable ejecting apparatus comprising a motor support platform rigidly connected to a supporting structure, the longitudinal axis of the platform being substantially at right angles to the axis of the cable drum, a motor connected to and slidable longitudinally of said platform, an idler wheel mounted in connection with said supporting structure to rotate on an axis substantially at right angles to the longitudinal axis of said platform, a shaft driven by said motor and arranged substantially parallel to the axis of said idler wheel, a power wheel connected to said shaft to be driven with it and to move in relation to said platform with said motor and driven shaft, means for guiding cable from the drum to be frictionally engaged between the peripheral surfaces of said wheels, means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus, an elevating guide mounted in connection with said supporting structure to rock on an axis substantially parallel to that of said power wheel, and means adapted, on movement of the motor towards and away from the cable drum within the range of cooperating contact of said wheels for ejecting cable, to rock said elevating guide to depress or elevate cable after it has left said wheels.

5. A mechanical cable layer comprising means for supporting a drum of cable for rotation, brake means for controlling the rotation of the drum, and cable ejecting apparatus comprising a substantially horizontal motor support platform secured to a supporting structure, the longitudinal axis of the platform being substantially at right angles to the axis of the cable drum, a motor connected to and slidable longitudinally of said platform, a shaft driven by said motor to rotate on an axis substantially parallel to that of the cable drum, a power wheel connected to said shaft to be driven with it and to move longitudinally of said platform with said motor and shaft, a substantially upright bracket fixed in relation to said platform, an idler wheel housing supported by said bracket, an idler shaft rotatable in said housing on an axis substantially parallel to that of said power wheel, said idler shaft being spaced from the path travelled by said power wheel during sliding of said motor longitudinally of said platform and movable in said housing only substantially at right angles to said path, resilient means urging said idler shaft towards said path, an idler wheel mounted on said idler shaft, means for guiding cable from the drum to be frictionally engaged between the peripheral surfaces of said wheels, means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus, an elevating guide mounted in connection with said supporting structure to rock on an axis substantially parallel to that of said power wheel, and means adapted, on movement of the motor towards and away from the cable drum within the range of cooperating contact of said wheels for ejecting cable, to rock said elevating guide to depress or elevate cable after it has left said wheels.

6. A mechanical cable layer comprising means for supporting a drum of cable for rotation, brake means for controlling the rotation of the drum, and cable ejecting apparatus comprising a motor support platform rigidly connected to a supporting structure, the longitudinal axis of the platform being substantially at right angles to the axis of the cable drum, a motor connected to and slidable longitudinally of said platform, an idler wheel mounted in connection with said supporting structure to rotate on an axis substantially at right angles to the longitudinal axis of said platform, a shaft driven by said motor and arranged substantially parallel to the axis of said idler wheel, a power wheel connected to said shaft to be driven with it and to move in relation to said platform with said motor and driven shaft, means for guiding cable from the drum to be frictionally engaged between the peripheral surfaces of said wheels, means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus, and an elevating guide actuated by movement of the motor away from and towards the cable drum within the range of cooperating contact of said wheels for ejecting cable adapted to elevate or depress the cable after it has left said wheels, and comprising an arm mounted in connection with said supporting structure to rock about an axis substantially parallel to the axes of said wheels, the end of the arm farther from the cable drum having a guide member, and the other end being engaged by a member moving with the motor to depress such end on movement of the motor away from the drum and thereby to elevate the end having the guide member.

7. A mechanical cable layer comprising means for supporting a drum of cable for rotation, brake means for controlling the rotation of the drum, and cable ejecting apparatus comprising a substantially horizontal motor support platform secured to a supporting structure, the longitudinal axis of the platform being substantially at right angles to the axis of the cable drum, a motor connected to and slidable longitudinally of said platform, a shaft driven by said motor to rotate on an axis substantially parallel to that of the cable drum, a power wheel connected to said shaft to be driven with it and to move longitudinally of said platform with said motor and shaft, a substantially upright bracket fixed in relation to said platform, an idler wheel housing supported by said bracket, an idler shaft rotatable in said housing on an axis substantially parallel to that of said power wheel, said idler shaft being spaced from the path travelled by said power wheel during sliding of said motor longitudinally of said platform and movable in said housing only substantially at right angles to said path, resilient means urging said idler shaft towards said path, an idler wheel mounted on said idler shaft, means for guiding cable from the drum to be frictionally engaged between the peripheral surfaces of said wheels, means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus, and an elevating guide actuated by movement of the motor away from and towards the cable drum within the range of cooperating contact of said wheels for ejecting cable adapted to elevate or depress the cable after it has left said wheels, and comprising an arm mounted on said upright bracket to rock about an axis substantially parallel to the axes of said wheels, the end of the arm farther from the cable drum having a guide member, and the other end being engaged by a member moving with the motor to depress such end on movement of the motor away from the drum and thereby to elevate the end having the guide member.

8. A mechanical cable layer comprising means for supporting a drum of cable for rotation, brake means for controlling the rotation of the drum, and cable ejecting apparatus comprising a motor support platform rigidly connected to a supporting structure, the longitudinal axis of the platform being substantially at right angles to the axis of the cable drum, a motor connected to and slidable longitudinally of said platform, an idler wheel mounted in connection with said supporting structure to rotate on an axis substantially at right angles to the longitudinal axis of said platform, a shaft driven by said motor and arranged substantially parallel to the axis of said idler wheel, a power wheel connected to said shaft to be driven with it and to move in relation to said platform with said motor and driven shaft, means for guiding cable from the drum to be frictionally engaged between the peripheral surfaces of said wheels, means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus, and an elevating guide actuated by movement of the motor away from and towards the cable drum within the range of cooperating contact of said wheels for ejecting cable, adapted to elevate or depress the cable after it has left said wheels, and comprising an arm mounted in connection with said supporting structure to rock about an axis substantially parallel to the axes of said wheels, the end of the arm farther from the cable drum having a guide member and the other end having a roller which is engaged by a member moving with the motor to depress such end of the arm on movement of the motor away from the drum, the elevation of such end being effected by a spring after said roller has been released on movement of the motor towards the cable drum.

9. A mechanical cable layer comprising means for supporting a drum of cable for rotation, brake means for controlling the rotation of the drum, and cable ejecting apparatus comprising a substantially horizontal motor support platform secured to a supporting structure, the longitudinal axis of the platform being substantially at right angles to the axis of the cable drum, a motor connected to and slidable longitudinally of said platform, a shaft driven by said motor to rotate on an axis substantially parallel to that of the cable drum, a power wheel connected to said shaft to be driven with it and to move longitudinally of said platform with said motor and shaft, a substantially upright bracket fixed in relation to said platform, an idler wheel housing supported by said bracket, an idler shaft rotatable in said housing on an axis substantially parallel to that of said power wheel, said idler shaft being spaced from the path travelled by said power wheel during sliding of said motor longitudinally of said platform and movable in said housing only substantially at right angles to said path, resilient means urging said idler shaft towards said path, an idler wheel mounted on said idler shaft, means for guiding cable from the drum to be frictionally engaged between the peripheral surfaces of said wheels, means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus, and an elevating guide actuated by movement of the motor away from and towards the cable drum within the range of cooperating contact of said wheels for ejecting cable, adapted to elevate or depress the cable after it has left said wheels, and comprising an arm mounted on said upright bracket to rock about an axis substantially parallel to the axes of said wheels, the end of the arm farther from the cable drum having a guide member and the other end having a roller which is engaged by a member moving with the motor to depress such end of the arm on movement of the motor away from the drum, the elevation of such end being effected by a spring after said roller has been released on movement of the motor towards the cable drum.

10. A mechanical cable layer as defined in claim 8, in which the guide member is pivotally mounted on its arm to pivot on an axis substantially parallel to that on which the arm rocks, and means are provided for locking the guide member in a selected position.

11. A mechanical cable layer comprising means for supporting a drum of cable for rotation, brake means for controlling the rotation of the drum, and cable ejecting apparatus comprising a substantially horizontal motor support platform secured to a supporting structure, the longitudinal axis of the platform being substantially at right angles to the axis of the cable drum, a motor connected to and slidable longitudinally of said platform, a shaft driven by said motor to rotate on an axis substantially parallel to that of the cable drum, a power wheel connected to said shaft to be driven with it and to move longitudinally of said platform with said motor and shaft, a substantially upright bracket fixed in relation to said platform, an idler wheel housing supported by said bracket, an idler shaft rotatable in said housing on an axis substantially parallel to that of said power wheel, said idler shaft being spaced from the path travelled by said power wheel during sliding of said motor longitudinally of said platform and movable in said housing only substantially at right angles to said path, resilient means urging said idler shaft towards said path, an idler wheel mounted on said idler shaft, means for guiding cable from the drum to be frictionally engaged between the peripheral surfaces of said wheels, means for sliding the motor longitudinally of its support platform to bring the peripheral surface of the power wheel into cooperating relationship with the corresponding surface of the idler wheel to press cable from the drum against the idler wheel and, on operation of the motor, to draw cable from the drum and eject it from said apparatus, and an elevating guide actuated by movement of the motor away from and towards the cable drum within the range of cooperating contact of said wheels for ejecting cable adapted to elevate or depress the cable after it has left said wheels, and comprising an arm mounted on said upright bracket to rock about an axis substantially parallel to the axes of said wheels, the end of the arm farther from the cable drum having a tubular guide member the inner surface of which is formed to deflect cable therefrom at an angle approximately equal to that at which it strikes said inner surface, and the other end having a roller which is engaged by a member moving with the motor to depress such end of the arm on movement of the motor away from the drum, the elevation of such end being effected by a spring after said roller has been released on movement of the motor towards the cable drum, and the guide member being pivotally mounted on said arm, to pivot on an axis substantially parallel to that on which the arm rocks, to vary the angle at which cable strikes the said inner surface to permit cable to be passed through said guide member without substantial deflection or to be deflected at angles varying in degree according to elevation of said elevating guide arm and pivotal adjustment of said guide member on said arm.

12. A mechanical cable layer as defined in claim 2, in which the means for moving said motor on said supporting structure comprises a control lever and means connecting such lever to the motor and to the cable drum brake means to transmit movement of the lever in one direction to disengage the braking means and move the motor to engage the power wheel to eject cable, and movement in the opposite direction to disengage the power wheel and engage the braking means.

13. A mechanical cable layer as defined in claim 8, in which the means for moving said motor on said support platform comprises a control lever pivoted on a mounting fixed in relation to said platform, means connecting said lever to the motor and to the cable drum brake means to transmit movement of the lever in one direction to disengage the braking means and to move the motor on its support to engage the power wheel to eject cable, and further movement in the same direction to elevate the guide member, and to transmit movement in the opposite direction firstly, to permit depression of the guide member by its spring and secondly to disengage the power wheel and hence discontinue the ejecting action, and to actuate the braking means.

14. A mechanical cable layer as defined in claim 9, in which the means for moving said motor on said support platform comprises a control lever pivoted on a mounting fixed in relation to said platform, means connecting said lever to the motor and to the cable drum brake means to transmit movement of the lever in one direction to disengage the braking means and to move the motor on its support to engage the power wheel to eject cable, and further movement in the same direction to elevate the guide member, and to transmit movement in the opposite direction firstly, to permit depression of the guide member by its spring and secondly to disengage the power wheel and hence discontinue the ejecting action, and to actuate the braking means.

15. A mechanical cable layer comprising a supporting frame, a platform rotatable thereon about a vertical axis through 360°, means for locking the turntable in a selected position in relation to the frame, means for anchoring the frame to a carrying vehicle, a frame mounted on the rotatable platform in which is journalled a shaft for supporting a drum of cable for rotation, brake means for controlling the rotation of the shaft and the drum, and cable ejecting apparatus mounted above and in front of the drum to cooperate therewith, comprising a horizontal motor support platform the longitudinal axis of which is substantially at right angles to the axis of rotation of the cable drum, a motor mounted on a bed block slidable in grooved guideways of the motor support platform towards and away from the cable drum, a power wheel mounted on the motor shaft to be rotated thereby, a substantially upright bracket connected to said platform, an idler wheel housing supported by said bracket, an idler shaft rotatable in said housing on an axis substantially parallel to that of said power wheel, said idler shaft being spaced from the path travelled by said power wheel during sliding of said motor longitudinally of said platform and movable in said housing substantially only at right angles to said path, resilient means urging said idler shaft towards said path, an idler wheel mounted on said idler shaft, rear guide rollers indirectly connected to move with said motor for guiding cable from the drum to be frictionally engaged between the peripheral surfaces of said wheels, means for sliding the motor in the horizontal plane on its support platform to bring the peripheral surface of the wheel mounted on its shaft into cooperating relationship with the peripheral surface of the idler wheel to engage cable frictionally between the two wheels and, on operation of said motor, to draw cable from the drum and eject it from said wheels, front guide rollers supported on said upright bracket to receive cable after leaving said wheels, and cable elevating and depressing means comprising an arm mounted on said upright bracket to rock about an axis substantially parallel to the axes of said wheels, the end of the arm nearer to the cable drum being engaged by a member moving with the motor to depress such end of the arm on movement of the motor away from the drum and thereby to elevate the other end, such other end having a guide member through which ejected cable is adapted to pass and the movement of the motor necessary to rock the arm being within the range of cooperating contact of said wheels.

16. A mechanical cable layer as defined in claim 15, in which the means for sliding said motor on its support platform comprises a control lever pivoted on a mounting fixed in relation to said platform, and means connecting said lever to the motor and to the cable drum brake means to transmit movement of the lever in one direction to disengage the braking means and to move the motor on its support to engage the power wheel and further movement in the same direction to elevate the guide member, and to transmit movement in the opposite direction firstly, to discontinue contact between said wheels and hence the ejecting action, and to actuate the braking means.

17. A mechanical cable layer as defined in claim 15, in which the means for sliding said motor on its support platform comprises a manually controlled lever pivoted on a mounting fixed in relation to said platform, means connecting said lever to the cable drum brake means, and a telescopic rod connecting said lever to said motor bed block to transmit movement of the lever in one direction to disengage the braking means and to move the motor on its support to engage the power wheel and further movement in the same direction to elevate the guide member, and to transmit movement in the opposite direction to disengage the power wheel and hence discontinue the ejecting action and then to actuate the braking means, said telescopic rod comprising adjusting locking means and a twist grip handle connected to operate a Bowden wire which is in turn connected to the carburettor of said motor to control its speed.

18. A mechanical cable layer as defined in claim 15, in which the power wheel has a tough rubber tire in which is formed at least one shallow circumferential groove.

19. A mechanical cable layer comprising means for supporting a drum of cable for rotation, brake means for controlling the rotation of the drum, and cable ejecting apparatus comprising a support, a motor driven wheel carried by said support and reciprocable in relation thereto in a path substantially at right angles to the axis of said drum, an idler wheel in connection with said support rotatable on an axis substantially parallel to that of said motor driven wheel and spaced from said path, an elevating guide mounted in connection with said support to rock on an axis substantially parallel to that of said wheels, means reciprocating with said motor driven wheel in relation to said support adapted, on movement of said driven wheel within the range of cooperating contact of said wheels for ejecting cable, to rock said elevating guide to depress or elevate cable after it has left said wheels, a control lever, mean connecting said lever to said brake means and to said motor driven wheel to transmit movement of said lever in one direction to disengage said brake means and to move said motor driven wheel in said path to bring the peripheral surface of said wheel into cooperating relationship with the corresponding surface of said idler wheel to press cable from the drum against the idler wheel, and, on operation of said motor driven wheel, to draw cable from said drum and eject it from said apparatus, and to transmit further movement in the same direction to elevate said elevating guide, and to transmit movement in the opposite direction to said driven wheel to permit depression of said elevating guide and subsequently to discontinue the ejecting action, and to said brake means to engage such means after the ejecting action has been discontinued.

20. A mechanical cable layer as defined in claim 19 in which the axis of said idler wheel is during ejection of cable spaced from the path travelled by the closest part of said motor driven wheel a distance approximately equal to the algebraic sum of the radius of the idler wheel and the thickness of cable separating the two wheels.

WILFRED WILSON.